M. G. BASSETT.
TRANSMISSION GEARING.
APPLICATION FILED SEPT. 28, 1917.
1,281,120.
Patented Oct. 8, 1918.
2 SHEETS—SHEET 2.
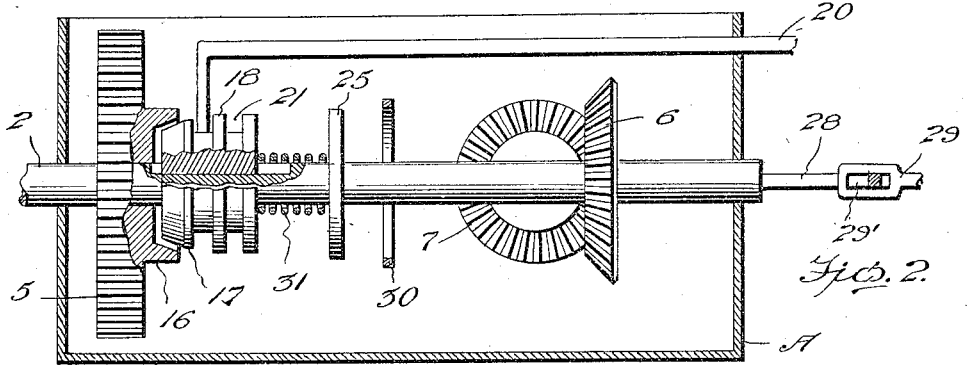
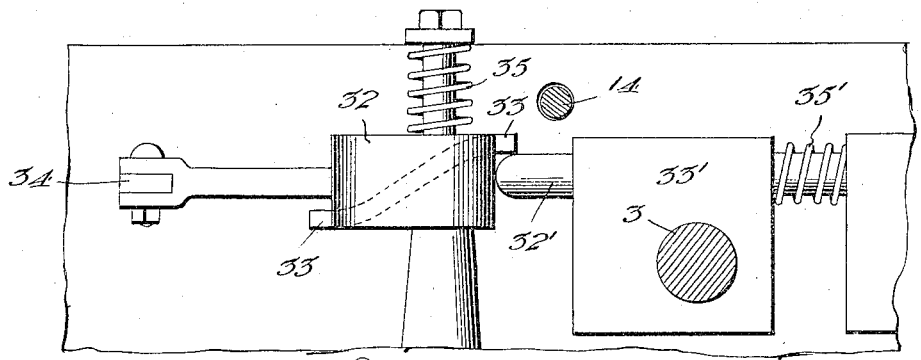
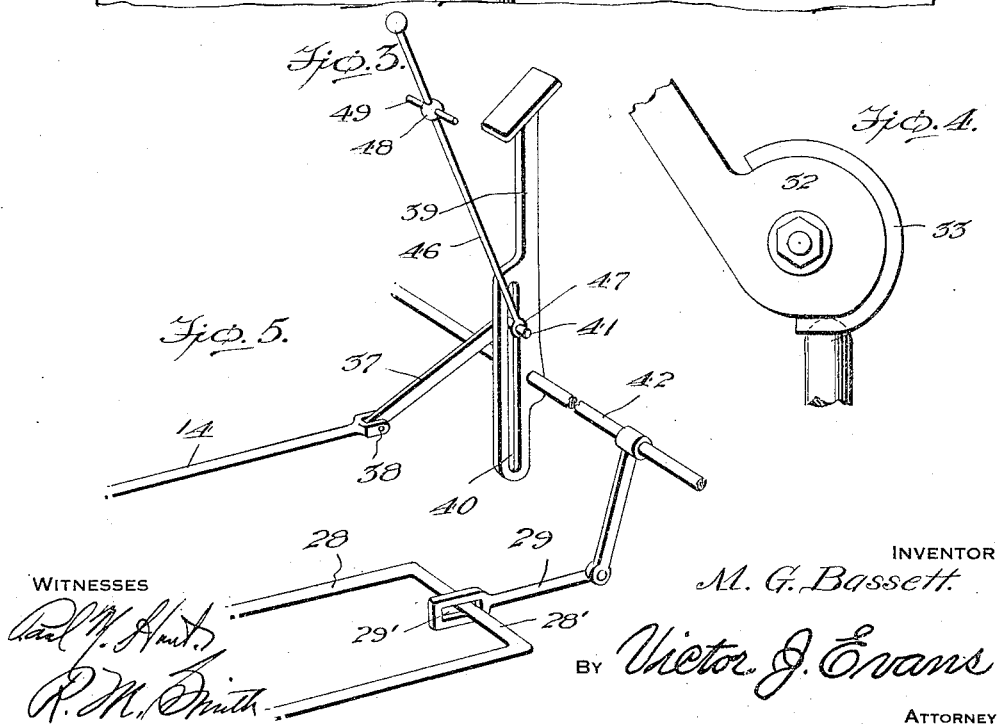
WITNESSES
INVENTOR
M. G. Bassett.
BY Victor J. Evans
ATTORNEY

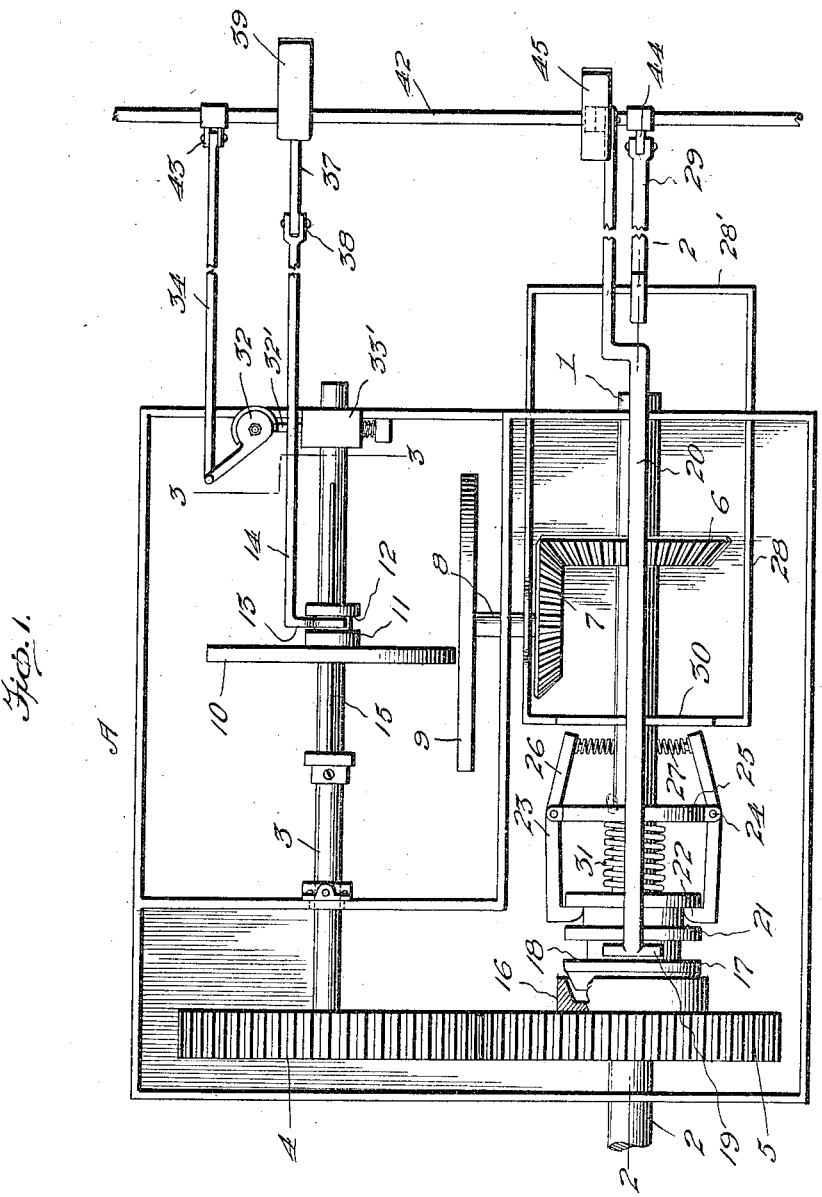

UNITED STATES PATENT OFFICE.

MERRITT G. BASSETT, OF GRAND RAPIDS, MICHIGAN.

TRANSMISSION-GEARING.

1,281,120.                Specification of Letters Patent.     Patented Oct. 8, 1918.

Application filed September 28, 1917. Serial No. 193,834.

*To all whom it may concern:*

Be it known that I, MERRITT G. BASSETT, a citizen of the United States, residing at Grand Rapids, in the county of Kent and State of Michigan, have invented new and useful Improvements in Transmission-Gearings, of which the following is a specification.

This invention relates to transmission gearing or gearing by means of which the ratio of speed is varied between a driving shaft and a driven shaft, the object in view being to provide gearing of the class referred to in which the speed of the driven shaft is gradually increased from neutral to a speed the same or practically the same as the driving shaft, at which point the driven shaft is automatically clutched directly to the driving shaft, and the mechanism by means of which the speed of the driven shaft is gradually increased, is thrown out of gear, the speed increasing mechanism being thus out of use most of the time and being used mainly for the purpose of increasing speed from neutral to high or direct drive thus eliminating any possibility of stripping gears and doing away with the usual hand control levers which under the present day automobile practice are located either in the center or at one side of the vehicle.

With the above and other objects in view, the invention consists in the novel construction, combination and arrangement of parts, herein described, illustrated and claimed.

In the accompanying drawings:—

Figure 1 is a plan view of the improved transmission gearing.

Fig. 2 is a section on the line 2—2 of Fig. 1.

Fig. 3 is a fragmentary section on the line 3—3 of Fig. 1, on an enlarged scale.

Fig. 4 is a detail view of the cams and the parts directly associated therewith.

Fig. 5 is a fragmentary view showing the controlling means for the changeable speed mechanism.

Referring to the drawings 1 designates the driving shaft and 2 the driven shaft of the transmission gearing, 3 designating a countershaft parallel to the shafts 1 and 2, and all of said shafts being journaled in a suitable frame or casing designated generally at A and of any suitable construction.

The shaft 3 is geared directly to the shaft 2 by means of the gears 4 and 5 fast on their respective shafts and always in constant mesh. The driving shaft 1 has fast thereon a gear 6 in constant mesh with another gear 7 fast on a short transvers shaft 8 having also fast thereon a friction disk 9, the shaft 8 being journaled in a part of the frame A. The disk 9 is thus driven continuously as long as the driving shaft 1 is in motion.

Feathered to and slidable longitudinally of the countershaft 3 is a friction wheel 10 having a hub 11 formed with an annular groove 12 to receive the forked end 13 of a wheel shifting member 14, the latter being shown in the form of a longitudinally movable rod by the movement of which the wheel 10 is shifted longitudinally of the countershaft 3, 15 designating a feather or spline which engages the wheel 10 and causes said wheel to rotate with and drive the shaft 3, the wheel 10 being driven by the disc 9 when in frictional contact with the latter.

The gear 5 is provided on its inner face with a clutch member or clutch face 16 with which a shiftable clutch member or face 17 is adapted to coöperate. The clutch member 17 comprises a hub formed with an annular groove 18 to receive a shifting arm 19 on a clutch releasing member 20 shown in the form of a rod which extends into the driver's compartment where it is connected to a foot lever, pressure upon which will shift the member 20 so as to draw the clutch member 17 out of engagement with the clutch member 16. The hub of the clutch member 17 is formed with another annular groove 21 to receive projections 22 on the ends of a pair of clutch retracting arms 23 which are pivotally mounted at 24 on a collar 25 fast on the driving shaft 1. The arms 24 are provided with inclined and converging portions 26 the extremities of which are forced outwardly away from the shaft 1 and away from each other by means of expansion springs or spreading members 27. The clutch tripping mechanism comprises a frame 28 shown as of rectangular formation and having attached thereto an operating connection 29 shown in the form of a rod adapted to be connected to the control lever within reach of the operator. The frame 28 has fixedly associated therewith an annulus or ring 30 which embraces the inclined portions 26 of the clutch retracting arms 23. When the frame 28, is pushed in the direction of the gear 5, the ring or annulus 30 slides upon the inclined portions 26 of the clutch retracting arms, rocking said arms on their pivotal connection with the collar 25 until the projections 23 of said arms move out of the groove 21. This releases the clutch member 17 which is then forced into frictional and driving contact with the clutch member 16 by means of a clutch spring 31 which is interposed between the hub of the clutch member 17 and the collar 25. The clutch retracting arms and also the clutch member 17 revolve constantly with the driving shaft 1.

The means for pressing the friction wheel 10 into driving contact with the friction disk 9, comprises a cam shown in detail in Fig. 4, said cam comprising a body 32 and a flange 33 on the peripheral surface of the body 32, said flange 33 being spirally disposed and operating in contact with the end of a pin or projection 32' on a slidable bearing 33' for the countershaft 3 so that as the cam is turned in one direction by means of a suitable cam operating member 34, the shaft 3 is pressed toward the disk 9 until a driving contact is established between the disk 9 and the friction wheel 10. After the cam 32 is turned a predetermined distance, in accordance with the length of the flange 33, the latter passes out of engagement with the shaft 3 and allows the latter to shift sufficiently away from the disk 9 to relieve the driving contact between the disk 9 and the wheel 10. Then the cam 32 is returned to its initial position by means of a return spring 35 which encircles the shaft 36 on which the cam is mounted. The cam is now in position to again perform its function. Simultaneously with the termination of the operation of the cam 32, the friction wheel 10 is moved to a position out of contact with the friction disk 9 by the action of a spring 35' against the bearing 33'.

The controlling means for the wheel shifting member 14 comprises a link 37 one end of which is connected to the connection 14 by a pivot 38. The link 37 is connected to a lever 39, preferably a foot lever arranged within reach of the operator, said lever 39 being formed with a longitudinal slot 40, which receives a pin 41 at the adjacent end of the link 37. The fulcrum of the lever 39 is located in longitudinal alinement with the member 14 and the pin 41 may be shifted to either side of said fulcrum point 42 for the purpose of either pushing or pulling the connection 14 with the result that the friction wheel 10 is moved from the center of the disk 9 in one direction or the other toward the periphery of said disk according to the position of the link 37 in relation to the lever 39. 42 designates a rock shaft to an arm 43 of which the cam operating connection 34 is attached. The lever 39 is also fast on the shaft 42 so that said lever controls both the connection 14 and the connection 34. The connection 29 is also attached to an arm 44 of the shaft 42 and is therefore controlled by the same lever which controls the connections 14 and 34. The direct drive connection 20 is attached to a foot lever 45 on the shaft 42.

In the operation of the transmission gearing, the connections 14, 34 and 29 are so associated with the single controlling lever that when said lever is pressed upon, the cam 32 is first operated to throw the friction wheel 10 against the center of the friction disk 9. As the movement of the lever 39 continues, the friction wheel 10 is moved toward the periphery of the friction disk 9. When the wheel 10 reaches a predetermined point on the disk 9 adjacent to the periphery thereof, the shaft 2 is being driven at the same speed as the driving shaft 1. Then by a further movement of the lever 39, the cam 32 releases the counter shaft 3, allowing the wheel 10 to move away from the disk 9, immediately after which the wheel 10 is returned to its initial position central to the friction disk 9 but out of driving engagement therewith. Just as the operation last referred to takes place, the clutch tripping means is thrown into operation, the clutch holding arms 23 moving out of the groove 21 and thereby permitting the spring 31 to throw the clutch 17 into driving engagement with the clutch 16, the mechanism is now in the position known as direct drive while the friction wheel 10 is idle. By increasing the speed of the shaft 2 to the same point as the shaft 1, when the clutch is thrown into action between the driving shaft 1 and the driven shaft 2, there is no jerking action, thereby greatly relieving strains on the different parts of the changeable speed mechanism. The clutch is thrown out of operation by a backward movement of the operating connection or clutch releasing member 20 and a movement in the corresponding direction of the clutch tripping means, the clutch arms 23 being restored to their engagement with the hub of the clutch member 17 by means of the springs 27. The means for adjusting the pin 41 is shown as consisting of a lever 46 having at its lower end an eye 47 to receive the pin 41. The lever 46 extends through a combined guide and bearing 48 preferably in the form of a ball having oppositely projecting pintles 49 adapted to be received in a suitable bearing member which may be supported on any convenient part of the vehicle such as the floor, dash or seat structure. By means of the lever 46, the pin 41 may be shifted lengthwise of the slot 40 of the foot lever 49 for the purpose hereinabove set forth. In order to enable the cone clutch to be thrown out or released without using the pedal 39, the member 29 is formed with an end longitudinal slot 29' to receive a transverse connecting portion 28' of the member 28 as shown in Fig. 5. This allows the clutch to be released without shifting the transmission gearing.

I claim:—

1. Transmission gearing embodying in combination, a driving shaft, a driven shaft in longitudinal alinement therewith, a countershaft parallel to the driving and driven shafts, a friction wheel feathered to and slidable longitudinally upon said countershaft, a driving connection between the countershaft and the driven shaft, a friction disk journaled at right angles to the countershaft and driving shaft and constantly geared to said driving shaft and actuated thereby, means for laterally shifting the countershaft to throw the friction wheel into driving contact with the friction disk, means for shifting said friction wheel across the face of the friction disk, a clutch on the driven shaft, a clutch on the driving shaft movable into and out of engagement with said clutch on the driven shaft, and controlling means whereby said clutch is thrown into operation simultaneously with the movement of the friction wheel out of driving engagement with the friction disk.

2. Transmission gearing embodying in combination, a driving shaft, a driven shaft in longitudinal alinement therewith, a countershaft parallel to the driving and driven shafts, a friction wheel feathered to and slidable longitudinally upon said countershaft, a driving connection between the counter shaft and the driven shaft, a friction disk journaled at right angles to the countershaft and driving shaft and constantly geared to said driving shaft and actuated thereby, means for laterally shifting the countershaft to throw the friction wheel into driving contact with the friction disk, means for shifting said friction wheel across the face of the friction disk, a clutch on the driven shaft, a clutch on the driving shaft movable into and out of engagement with said clutch on the driven shaft, and controlling means whereby said clutch is thrown into operation simultaneously with the movement of the friction wheel out of driving engagement with the friction disk, the means for shifting the friction wheel into engagement with the friction disk and the means for shifting the friction wheel across the face of the disk being controlled by a single manually operable lever and the shifting connections being such that the friction wheel is first shifted into driving engagement with the friction disk and then shifted across the face of the friction disk by a continued movement of said lever.

3. Transmission gearing embodying in combination, a driving shaft, a driven shaft in longitudinal alinement therewith, a countershaft parallel to the driving and driven shafts, a friction wheel feathered to and slidable longitudinally upon said countershaft, a driving connection between the countershaft and the driven shaft, a friction disk journaled at right angles to the countershaft and driving shaft and constantly geared to said driving shaft and actuated thereby, means for laterally shifting the countershaft to throw the friction wheel into driving contact with the friction disk, means for shifting said friction wheel across the face of the friction disk, a clutch on the driven shaft, a clutch on the driving shaft movable into and out of engagement with said clutch on the driven shaft, controlling means whereby said clutch is thrown into operation simultaneously with the movement of the friction wheel out of driving engagement with the friction disk, the clutch comprising a shiftable clutch member rotating with the driving shaft, a spring for pressing the movable clutch member into engagement with the clutch member on the driven shaft, clutch holding arms carried by and pivotally related to the driving shaft, means for normally holding said clutch arms in engagement with the movable clutch member when the latter is disengaged, and means coöperating with said arms to shift the latter out of engagement with said movable clutch member.

4. In transmission gearing, a driving shaft, a driven shaft in longitudinal alinement therewith, a countershaft parallel to the driving and driven shafts and constantly geared to the driven shaft, changeable speed mechanism between the driving shaft and the countershaft, clutch members on the driving and driven shafts, and means for causing said clutch members to be thrown into engagement when the driven shaft reaches a predetermined speed through the medium of the changeable speed mechanism.

5. In transmission gearing, a driving shaft, a driven shaft in longitudinal alinement therewith, a countershaft parallel to the driving and driven shafts and constantly geared to the driven shaft, changeable speed mechanism between the driving shaft and the countershaft, clutch members on the driving and driven shafts, means for causing said clutch members to be thrown into engagement when the driven shaft reaches a predetermined speed through the medium of the changeable speed mechanism, and means for throwing the changeable speed mechanism out of operation concurrently with the engaging movement of said clutch members.

6. Transmission gearing embodying in combination, a driving shaft, a driven shaft in longitudinal alinement therewith, a countershaft parallel to the driving and driven shafts, a friction wheel feathered to and slidable longitudinally upon said countershaft, a driving connection between the countershaft and the driven shaft, a friction disk journaled at right angles to the countershaft and driving shaft and constantly geared to said driving shaft and actuated thereby, means for laterally shifting the counter shaft to throw the friction wheel into driving contact with the friction disk, means for shifting said friction wheel across the face of the friction disk, a clutch on the driven shaft, a clutch on the driving shaft movable into and out of engagement with said clutch on the driven shaft, controlling means whereby said clutch is thrown into operation simultaneously with the movement of the friction wheel out of driving engagement with the friction disk, means for retracting the movable clutch member, and means for releasing said movable clutch member.

7. Transmission gearing embodying in combination, a driving shaft, a driven shaft in longitudinal alinement therewith, a countershaft parallel to the driving and driven shafts, a friction wheel feathered to and slidable longitudinally upon said countershaft, a driving connection between the countershaft and the driven shaft, a friction disk journaled at right angles to the countershaft and driving shaft and constantly geared to said driving shaft and actuated thereby, means for laterally shifting the countershaft to throw the friction wheel into driving contact with the friction disk, means for shifting said friction wheel across the face of the friction disk, a clutch on the driven shaft, a clutch on the driving shaft movable into and out of engagement with said clutch on the driven shaft, controlling means whereby said clutch is thrown into operation simultaneously with the movement of the friction wheel out of driving engagement with the friction disk, and means for reversing the movement of the friction wheel shifting member without reversing the movement of the controlling lever therefor.

In testimony whereof I affix my signature.

MERRITT G. BASSETT.